(12) United States Patent
Bindu Jyothikumar et al.

(10) Patent No.: US 11,442,140 B1
(45) Date of Patent: Sep. 13, 2022

(54) DETERMINING A LOCATION OF A VEHICLE USING RECEIVED SURVEILLANCE SIGNALS

(71) Applicant: Honeywell International Inc., Morris Plains, NJ (US)

(72) Inventors: Arjun Bindu Jyothikumar, Golden Valley, MN (US); Thandava Krishna Edara, Plymouth, MN (US); Hai Pham, Eden Prairie, MN (US)

(73) Assignee: Honeywell International Inc., Charlotte, NC (US)

( * ) Notice: Subject to any disclaimer, the term of this patent is extended or adjusted under 35 U.S.C. 154(b) by 273 days.

(21) Appl. No.: 16/902,699

(22) Filed: Jun. 16, 2020

(51) Int. Cl.
| | |
|---|---|
| *G01S 5/14* | (2006.01) |
| *G08G 5/00* | (2006.01) |
| *G01S 5/08* | (2006.01) |
| *G01S 5/00* | (2006.01) |

(52) U.S. Cl.
CPC .............. *G01S 5/14* (2013.01); *G01S 5/0072* (2013.01); *G01S 5/08* (2013.01); *G08G 5/0008* (2013.01)

(58) Field of Classification Search
CPC ............ G01S 5/14; G01S 5/0072; G01S 5/08; G08G 5/0008
See application file for complete search history.

(56) References Cited

U.S. PATENT DOCUMENTS 9,523,761 B1   12/2016  Hoffmann et al.
2018/0020081 A1 * 1/2018  Teague ................... H04L 67/12

FOREIGN PATENT DOCUMENTS

WO   2018/178751 A1   10/2018
WO   2019/014824 A1   1/2019

OTHER PUBLICATIONS

Extended Search Report from counterpart European Application No. 21177184.5 dated Feb. 22, 2022, 11 pp.
Eichelberger et al., "Indoor Localization with Aircraft Signals," SenSys '17, ACM, Nov. 6-8, 2017, 14 pp.
Partial Extended Search Report from counterpart European Application No. 21177184.5 dated Nov. 17, 2021, 14 pp.
Siebler et al., "Hyperbolic Vehicle Localization Using a Single Signal of Opportunity and Trajectory Constraints," 22nd International Conference on Information Fusion, Jul. 2-5, 2019, 7 pp.

* cited by examiner

*Primary Examiner* — Kyaw Z Soe
(74) *Attorney, Agent, or Firm* — Shumaker & Sieffert, P.A.

(57) ABSTRACT

In some examples, a system includes at least three receivers configured to receive a surveillance packet from another vehicle at respective arrival times. The system includes a first receiver configured to receive a surveillance packet from the other vehicle at a first time. The system also includes a second receiver configured to receive the surveillance packet from the other vehicle at a second time. The system further include a third receiver configured to receive the surveillance packet from the other vehicle at a third time. In addition, the system includes processing circuitry configured to determine a location of the ownship vehicle based on the received surveillance packet and the respective arrival times.

20 Claims, 4 Drawing Sheets

DETERMINING A LOCATION OF A VEHICLE USING RECEIVED SURVEILLANCE SIGNALS

TECHNICAL FIELD

This disclosure relates to position determinations for vehicles.

BACKGROUND

The location of a vehicle (e.g., a manned or unmanned aircraft such as an urban air mobility system or an unmanned aerial vehicle) is important for the navigation of the vehicle. Global Navigation Satellite System (GNSS) is one of the main solutions that many vehicles use to determine location. However, even if a vehicle has GNSS, the GNSS may become degraded or unavailable. In addition, GNSS does not always provide a completely accurate position in different operating environments for the vehicle.

SUMMARY

In general, this disclosure relates to determining the position of a vehicle without or as a supplement to Global Navigation Satellite System. A system of this disclosure is configured to mount on an ownship vehicle and includes at least three receivers and processing circuitry. The at least three receivers are configured to receive a surveillance packet at respective arrival times, which may be different based on the direction from which the surveillance packet arrives. The processing circuitry is configured to then determine a location of the ownship vehicle based on the surveillance packet and the respective arrival times.

In some examples, a system includes at least three receivers configured to receive a surveillance packet from another vehicle at respective arrival times. The system includes a first receiver configured to receive a surveillance packet from the other vehicle at a first time. The system also includes a second receiver configured to receive the surveillance packet from the other vehicle at a second time. The system further include a third receiver configured to receive the surveillance packet from the other vehicle at a third time. In addition, the system includes processing circuitry configured to determine a location of the ownship vehicle based on the received surveillance packet and the respective arrival times.

In some examples, a method includes receiving, by a first receiver mounted on an ownship vehicle at a first time, a surveillance packet from another vehicle. The method also includes receiving, by a second receiver mounted on the ownship vehicle at a second time, the surveillance packet from the other vehicle. The method further includes receiving, by a third receiver mounted on the ownship vehicle at a third time, the surveillance packet from the other vehicle. The method includes determining a location of the ownship vehicle based on the received surveillance packet and based on the respective arrival times.

In some examples, a device comprising a computer-readable medium having executable instructions stored thereon, configured to be executable by processing circuitry for causing the processing circuitry to determine a first time at which a first receiver mounted on an ownship vehicle received a surveillance packet from another vehicle. The instructions are configured to be executable by the processing circuitry for further causing the processing circuitry to determine a second time at which a second receiver mounted on the ownship vehicle the surveillance packet from the other vehicle and to determine a third time at which a third receiver mounted on the ownship vehicle the surveillance packet from the other vehicle. The instructions are configured to be executable by the processing circuitry for further causing the processing circuitry to determine a location of the ownship vehicle based on the received surveillance packet and based on the respective arrival times.

The details of one or more examples of the disclosure are set forth in the accompanying drawings and the description below. Other features, objects, and advantages will be apparent from the description, drawings, and claims.

DETAILED DESCRIPTION

Various examples are described below for determining a position of a vehicle without Global Navigation Satellite System (GNSS) or as a supplement to GNSS. The vehicle can determine its position based on a surveillance packet received by multiple receivers mounted onboard the vehicle. The respective arrival times of the surveillance packet at each of the multiple receivers may indicate the angle from which the surveillance packet was received. Along with an estimate of the distance to the transmitter and/or a multilateration analysis for two or more surveillance packets, the angle of arrival can be used to determine the location of the vehicle.

Figure 1:
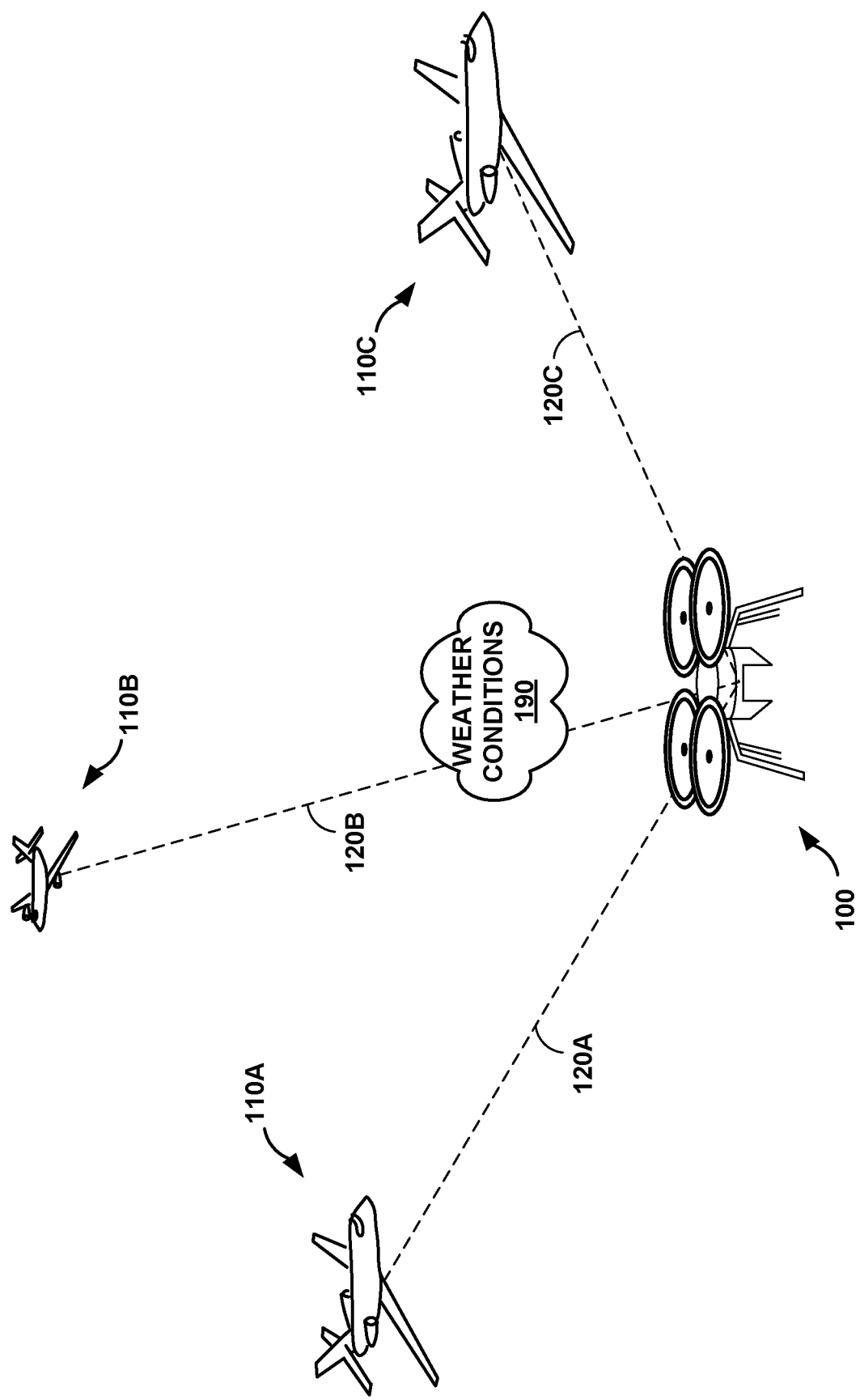
FIG. 1 is a conceptual block diagram of a vehicle receiving surveillance packets from other vehicles, in accordance with some examples of this disclosure.

FIG. 1 is a conceptual block diagram of a vehicle 100 receiving surveillance packets 120A-120C from other vehicles 110A-110C, in accordance with some examples of this disclosure. Vehicle 100 is referred to as the "ownship vehicle" because FIG. 1 is described from the perspective of a system mounted onboard vehicle 100. The functionality ascribed to vehicle 100 may be performed by a system that is mounted on vehicle 100.

Although vehicle 100 is depicted in FIG. 1 as an unmanned aerial vehicle (UAV) and vehicles 110A-110C are depicted as airplanes, vehicles 100 and 110A-110C can be any other vehicle or non-vehicle mobile object. In some examples, vehicle 100 may be an aircraft other than a UAV, such as an airplane, a helicopter, or a weather balloon. Vehicles 110A-110C may be an aircraft other than an airplane, such as a UAV, a helicopter, or a weather balloon. Vehicles 100 and 110A-110C may be space vehicles such as satellites or spaceships. In yet other examples, Vehicles 100 and 110A-110C may be land vehicles such as automobiles or water vehicles such as ships or submarines. Vehicles 100 and 110A-110C can be manned vehicles or unmanned vehicles, such as drones, remote-control vehicles, urban air mobility (UAM) systems, or any suitable vehicle with or without any pilot or crew on board.

In some examples, vehicle 100 is configured to perform the techniques of this disclosure using a surveillance packet received by vehicle 100 from a non-moving entity, such as a base station or a traffic control system. For example, vehicle 100 may receive a surveillance packet from a ground base station or a marine base station. The base station may operate as an Air Traffic Controller system or an autonomous vehicle traffic management system.

As shown in FIG. 1, vehicles 110A-110C can transmit respective surveillance packets 120A-120C, which include vehicle data such as the location, heading, and/or velocity of vehicles 110A-110C, where the location may include the latitude, longitude, and altitude of a vehicle. The vehicle data in surveillance packets 120A-120C may also include information such as the origin and destination, the heading, and the type (e.g., Boeing 737, Airbus A320, Freightliner CL, DJI Phantom, etc.) of vehicles 110A-110C. Surveillance packets 120A-120C may be periodic, unprompted broadcasts and/or replies to interrogation messages. The surveillance packets can include any form of position reporting signals, including automatic-dependent surveillance-broadcast (ADS-B), traffic collision avoidance system (TCAS), universal access transceiver (UAT), automatic identification system (AIS), and/or any other type of position reporting.

The payload of each of surveillance packets 120A-120C may include the time of transmission (e.g., in Universal Coordinated Time (UTC)) for the respective packet. For example, vehicle 110A may be configured to encode the time at which vehicle 110A transmits surveillance packet 120A into the data contained in surveillance packet 120A. Vehicles 110A-110C can determine the transmission time based on GNSS signals received by vehicles 110A-110C, an internal clock, and/or a satellite clock. Vehicle 110A, for example, may be configured to synchronize an internal clock onboard vehicle 110A based on GNSS signals received by vehicle 110A, where the GNSS signals include a time according to, e.g., a GNSS clock or a satellite clock.

Each of vehicles 110A-110C may be configured to transmit surveillance packets 120A-120C at a respective power level. The power level may be defined by an industry standard, such that all of vehicles 110A-110C transmit surveillance packets 120A-120C at the same power level. In some examples, the transmission power is determined by the transmitting vehicle based on the type of transmitting device (e.g., up to 250 watts for a transponder or a Universal Access Transmitter mounted on a UAV), where the device type may be indicated by a device code in the payload of the surveillance packet. As the signals carrying surveillance packets 120A-120C radiate outward, the effective power of the signals may decline such that the power of the signal received by vehicle 100 may be based on the distance between each transmitter onboard vehicles 110A-110C and the receiver onboard vehicle 100.

Vehicle 100 may be configured to determine the location, velocity, altitude, and/or orientation (e.g., pitch, roll, and yaw) of vehicle 100 based on data from available systems. For example, vehicle 100 may include systems such as GNSS, an inertial navigation system (INS), an altimeter, an accelerometer, and/or an attitude and heading reference system. Vehicle 100 may be configured to determine a turn rate, velocity, and acceleration for vehicle 100 based on data from the GNSS, INS, and accelerometer(s), for example.

However, the location of vehicle 100 as determined from a GNSS device may not always be accurate or available. For example, a defect in a GNSS device or spoofing by an attacker can result in an inaccurate position determination for vehicle 100. Moreover, a GNSS device can fail such that a location estimate is unavailable for vehicle 100. In addition, some vehicles may not be equipped with a GNSS device.

In accordance with the techniques of this disclosure, vehicle 100 may include at least three receivers for receiving surveillance packets 120A-120C from vehicles 110A-110C. The at least three receivers may be arranged at different positions on vehicle 100. Surveillance packet 120A, for example, may arrive at a first receiver onboard vehicle 100 at a first time, at a second receiver onboard vehicle 100 at a second time, and at a third receiver onboard vehicle 100 at a third time. Using time difference of arrival and/or multilateration techniques, vehicle 100 may be configured to determine a location of vehicle 100 based on surveillance packet 120A and the arrival times.

Using the techniques of this disclosure to determine the location of an ownship vehicle may be especially useful for vehicles that do not have a GNSS device onboard. However, the techniques of this disclosure may also be useful for vehicles with a GNSS device. For example, a vehicle can use the techniques of this disclosure to supplement or validate the location determined by a GNSS device. As one example, determining a location based on the arrival times of a surveillance packet can provide a sanity check for a location determined by a GNSS device.

Additionally or alternatively, a location determined based on the arrival times of a surveillance packet can be used to detect GNSS spoofing or ADS-B spoofing by cross-referencing with a location determined by a GNSS device. For example, vehicle 100 may be configured to compare a first location determined based on arrival times and a second location determining based on GNSS. In response to determining that a difference between the first and second locations exceeds a threshold amount, vehicle 100 may be configured to determine that GNSS spoofing or surveillance-message spoofing has occurred (e.g., surveillance packet 120A is a spoofed packet).

In some examples, vehicle 100 may determine the location of vehicle 100 based on a time difference of arrival analysis of two or more surveillance packets received by vehicle 100. The two or more surveillance packets may be transmitted by a single vehicle or multiple vehicles. Vehicle 100 may be configured to determine the estimate of the location of vehicle 100 using triangulation techniques on a first and second surveillance packet, as long as the transmitting vehicle is not moving directly towards or away from vehicle 100. Vehicle 100 can determine an initial location estimate based on the first surveillance packet and can determine a refined location estimate based on the second surveillance packet. Vehicle 100 may be configured to apply Kalman filtering techniques to determine the refined location estimate.

Vehicle 100 may use the data in the payload of surveillance packet 120A to determine the location of vehicle 100. For example, the payload of surveillance packet 120A may include data such as the location and velocity of vehicle 110A, the time of transmission of surveillance packet 120A, and a device identification code. In some examples, vehicle 100 can use some or all of this data, along with the arrival times, to determine the location of vehicle 100. Vehicle 100 may be configured to also use the orientation of vehicle 100, as determined by an INS or an attitude and heading reference system onboard vehicle 100, to determine the location of vehicle 100.

Once vehicle 100 has an estimate of the location of vehicle 100, vehicle 100 may be configured to use the estimate along with a known location of vehicle 110B to determine weather conditions 190. For example, vehicle 100 may be configured to determine that weather conditions 190 include a storm cell with high reflectivity or another microweather pattern in response to determining that the actual signal strength of surveillance packet 120B is less than the expected signal strength of surveillance packet 120B. Vehicle 100 can determine the expected signal strength of surveillance packet 120B based on the distance between vehicles 100 and 110B and the transmitting power level. Vehicle 100 may be configured to determine the attenuation caused by weather conditions 190 by subtracting the actual signal strength from the expected signal strength.

In examples in which vehicle 100 knows weather conditions 190 in the path of surveillance packet 120B, vehicle 100 may be configured to determine an estimate of the distance between vehicles 100 and 110B. For example, vehicle 100 can determine an expected attenuation based on weather conditions 190. Based on the attenuation, the transmitting power level, actual received power level, vehicle 100 may be configured to determine the distance between from vehicle 100 to vehicle 110B.

Figure 2:
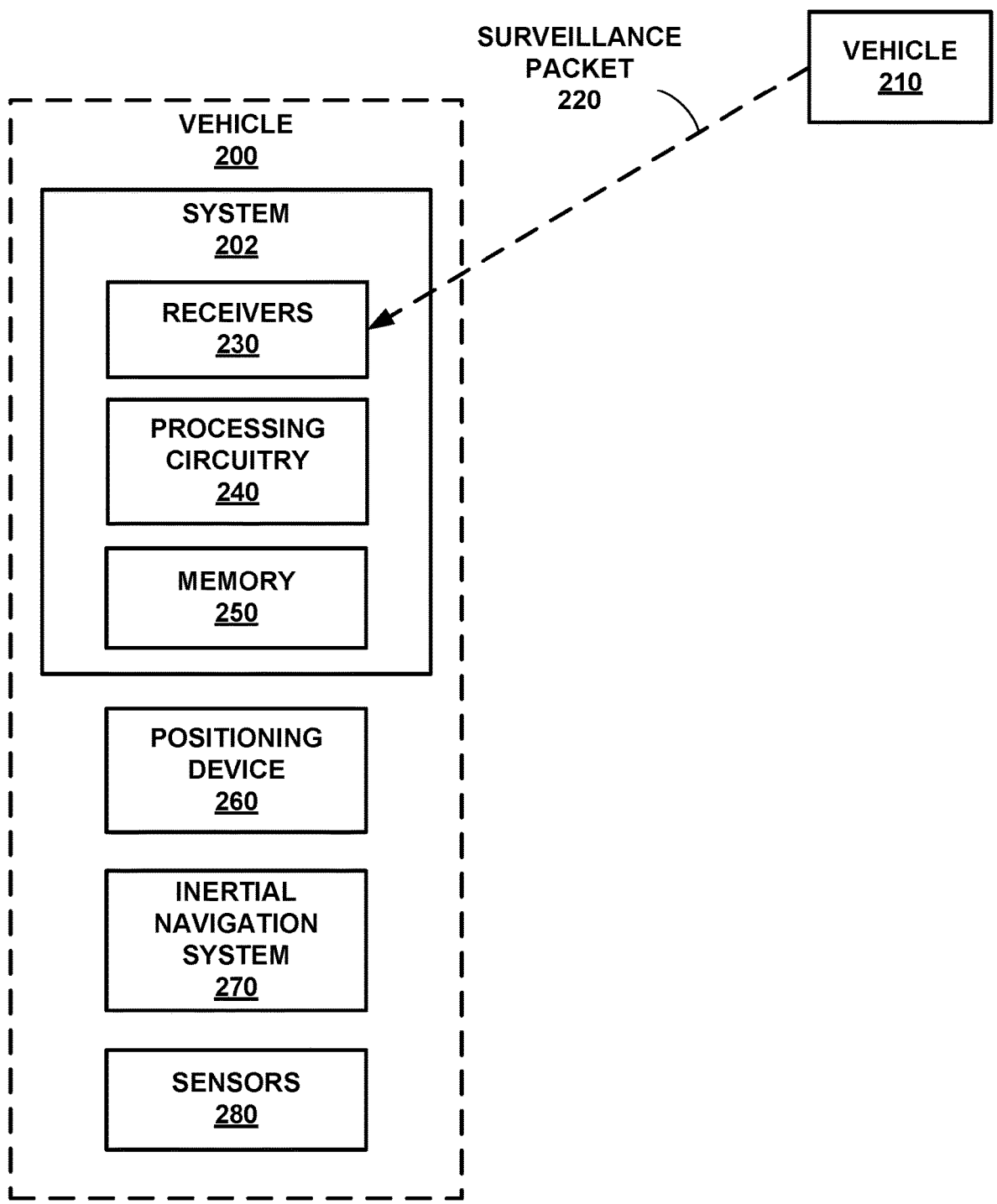
FIG. 2 is a conceptual block diagram of a vehicle including receivers, processing circuitry, a positioning device, an inertial navigation system, and sensors, in accordance with some examples of this disclosure.

FIG. 2 is a conceptual block diagram of a vehicle 200 including receivers 230, processing circuitry 240, a positioning device 260, an inertial navigation system 270, and sensors 280, in accordance with some examples of this disclosure. In the example shown in FIG. 2, system 202 is mounted onboard vehicle 200, and system 202 includes receivers 230, processing circuitry 240, and memory 250. Positioning device 260, an inertial navigation system 270, and sensors 280 are optional components that can also be mounted onboard vehicle 200.

Receivers 230 are configured to receive surveillance packet 220 from vehicle 210. For example, system 202 may include a first receiver arranged on vehicle 200 at a first position, a second receiver arranged on vehicle 200 at a second position, and a third receiver arranged on vehicle 200 at a third position, where the first, second, and third positions are different. Further details about systems with multiple receivers are described throughout this disclosure, including with respect to system 302 shown in FIG. 3.

Processing circuitry 240 may be configured to determine the location of vehicle 200 based on surveillance packet 220 using, for example, time difference of arrival and/or multilateration techniques. Processing circuitry 240 may include any suitable arrangement of hardware, software, firmware, or any combination thereof, to perform the techniques attributed to processing circuitry 240 herein. Examples of processing circuitry 240 include any one or more microprocessors, digital signal processors (DSPs), application specific integrated circuits (ASICs), field programmable gate arrays (FPGAs), or any other equivalent integrated or discrete logic circuitry, as well as any combinations of such components. When processing circuitry 240 includes software or firmware, processing circuitry 240 further includes any hardware for storing and executing the software or firmware, such as one or more processors or processing units.

In general, a processing unit may include one or more microprocessors, DSPs, ASICs, FPGAs, or any other equivalent integrated or discrete logic circuitry, as well as any combinations of such components. Processing circuitry 240 may be communicatively coupled to memory 250, which is configured to store data. Memory 250 may include any volatile or non-volatile media, such as a random access memory (RAM), read only memory (ROM), non-volatile RAM (NVRAM), electrically erasable programmable ROM (EEPROM), flash memory, and the like. In some examples, memory 250 may be external to processing circuitry 240 (e.g., may be external to a package in which processing circuitry 240 is housed).

Positioning device 260 is configured to determine the position or location of vehicle 200. Positioning device 260 may include satellite navigation equipment such as a GNSS configured to receive positioning signals from satellites and other transmitters. One example of a GNSS is a Global Positioning System (GPS). Positioning device 260 may be configured to deliver the received positioning signals to processing circuitry 240, which may be configured to determine the position of vehicle 200.

In examples in which vehicle 200 does not include positioning device 260, processing circuitry 240 may be configured to determine a location of vehicle 200 based on the arrival times for surveillance packet 220 and the data in the surveillance packet 220. In examples in which vehicle 200 includes positioning device 260, processing circuitry 240 can use the arrival times for surveillance packet 220 to determine a supplemental estimate of the location of vehicle 200. Additionally or alternatively, processing circuitry 240 may be configured to determine an estimate of the location of vehicle 200 based on the arrival times for surveillance packet 220 in order to determine whether any GNSS spoofing or surveillance-message spoofing has occurred. In examples in which positioning device 260 provides an estimate of the location of vehicle 200, processing circuitry 240 may be configured to determine whether vehicle 210 has been GNSS spoofed by comparing the location of vehicle 210 indicated in surveillance packet 220 to the relative positions of vehicles 200 and 210.

INS 270 may be configured to determine the velocity and/or orientation of vehicle 200. To determine the orientation of vehicle 200, INS 270 may be configured to determine the pitch, roll, and yaw of vehicle 200. In some examples, INS 270 can also determine the relative position of vehicle 200 using dead reckoning.

Sensors 280 may include one or more accelerometers (angular and/or linear accelerometers), one or more gyroscopes, one or more magnetic sensors, one or more speed sensors, and/or an altimeter. Some or all of sensors 280, such as one or more accelerometers and/or one or more gyroscopes, may be part of INS 270 or may provide data to INS 270.

Processing circuitry 240 may be configured to determine an orientation of vehicle 200 based on the outputs of INS 270 and/or sensors 280. Processing circuitry 240 may be configured to determine the direction from which surveillance packet 220 arrived at receivers 210 using the output of INS 270 and/or sensors 280. For example, processing circuitry 240 may combine the relative angle-of-arrival determination for surveillance packet 220 and the orientation of vehicle 200 to determine an absolute angle-of-arrival determination for surveillance packet 220.

Processing circuitry 240 may be configured to determine the location of vehicle 200 using just one surveillance packet received from just one source (e.g., vehicle 210). For example, processing circuitry 240 may be configured to determine the angle of arrival based on the time difference of arrival at three receivers, along with the known distance between the three receivers. The angle of arrival may be slightly different at each receiver, such that processing circuitry 240 can determine the range of vehicle 210 based on the difference in the arrival angles at each receiver.

Figure 3:
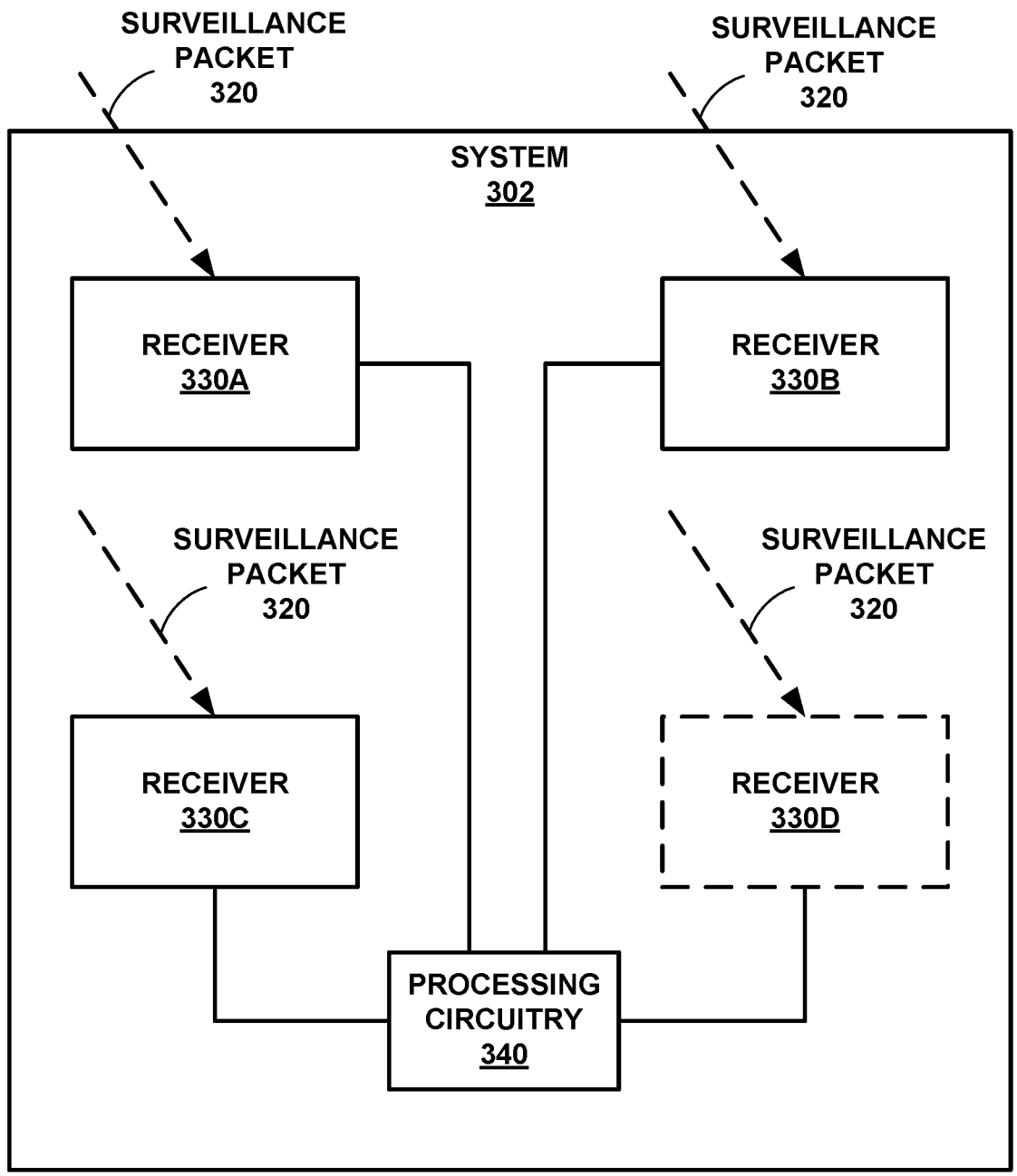
FIG. 3 is a conceptual block diagram of four receivers receiving a surveillance packet, in accordance with some examples of this disclosure.

FIG. 3 is a conceptual block diagram of four receivers 330A-330D receiving a surveillance packet 320, in accordance with some examples of this disclosure. Although system 302 is depicted in FIG. 3 as including four receivers 330A-330D, system 302 may include only three receivers in some examples. In other examples, system 302 may include five or more receivers. In addition, and as described below, system 302 may include a single receiver capable of implementing a power-based estimate of the location of an ownship vehicle.

Each of receivers 330A-330D may include a separate antenna. For example, receiver 330A may include a first antenna, and receiver 330B may include a second antenna that is separate from the first antenna. Additionally or alternatively, each of receivers 330A-330D may include a separate array of antenna elements (e.g., patch elements on a printed circuit board). For example, receiver 330A may include a first array of antenna elements, and receiver 330B may include a second array of antenna elements that is separate from the first array of antenna elements. In some examples, each of receivers 330A-330D may include a separate receiver device. For example, receiver 330A may include a first ADS-B In device or a first TCAS transceiver, and receiver 330B may include a second ADS-B In device or a second TCAS transceiver that is separate from the first ADS-B In device or a TCAS transceiver. The circuitry for processing signals received by receiver 330A may be separate from or partially or fully combined with the circuitry for processing signals received by receiver 330B.

Surveillance packet 320 arrives at receivers 330A-330D at different times in the example shown in FIG. 3. For example, surveillance packet 320 may arrive at receivers 330A-330D in the following order: receiver 330A, receiver 330B, receiver 330C, and receiver 330D. Processing circuitry 340 can use the arrival times of surveillance packet 320, together with the known propagation speed of the signal carrying surveillance packet 320, to determine the angle from which surveillance packet 320 arrived at system 302. Processing circuitry 340 can use the relative positions of receivers 330A-330D and data from an INS (e.g., with respect to the orientation of the ownship vehicle) to determine the angle from which surveillance packet 320 arrived at system 302. Processing circuitry 340 can construct a geometry of signal arrivals based on the arrival times and the relative positions of receivers 330A-330D in order to determine angle of arrival of surveillance packet 320.

Each of receivers 330A-330D may include a respective internal clock, and the four clocks may be synchronized based on, for example, signal received by a GNSS device. When the clocks of receivers 330A-330D are synchronized, system 302 can use the arrival times of surveillance packet 320 to determine a geometry of signal arrivals. In addition, system 302 may be configured to determine a distance between the transmitter (e.g., the other vehicle) and receivers 330A-330D based on the travel time and the propagation speed of the signals carrying surveillance packet 320. For example, system 302 can determine the travel time by determining the difference between the arrival time of surveillance packet 320 (e.g., a mean or median of the three or more arrival times) and the transmission time as indicated by data in the payload of the surveillance packet 320.

After determining the distance to the transmitter based on the travel time of surveillance packet 320, processing circuitry 340 may be configured to refine the estimate of the ownship vehicle location based on the strength of the signals received by receivers 330A-330D. Processing circuitry 340 may be capable of determining an expected attenuation based on the distance between the transmitter and system 302. In examples in which the actual attenuation is different from the expected attenuation, processing circuitry 340 can refine the initial estimate of the distance, as derived from the travel time. Processing circuitry 340 may be configured to also refine the distance estimation based on the weather conditions between the transmitter and system 302. For example, a high-reflectivity weather cell can increase the attenuation of signals passing through the weather cell.

In some examples, system 302 may include a single receiver for receiving surveillance packet 320. Processing circuitry 340 may be configured to determine the power level or signal strength of the received signals carrying surveillance packet 320. Processing circuitry 340 may be configured to also determine the transmission power based on an industry standard and/or the type of transmitter, as encoded in surveillance packet 320. Using the received power level and the transmission power, processing circuitry 340 can determine the distance between the transmitter and receiver based on the attenuation that is likely at that distance. Additionally or alternatively, processing circuitry 340 may be configured to determine a distance to the transmitter(s) based on the difference in signal strengths for two surveillance packets received by system 302.

Processing circuitry 340 may also be able to determine the angle of arrival at a single receiver using, for example, a phased array of antenna elements. Processing circuitry 340 can perform this analysis on multiple received surveillance packets that are sent by a moving transmitter to triangulate the location of the ownship vehicle. Using multiple received surveillance packets, processing circuitry 340 may be configured to perform a multilateration analysis to determine the location of the ownship vehicle.

Figure 4:
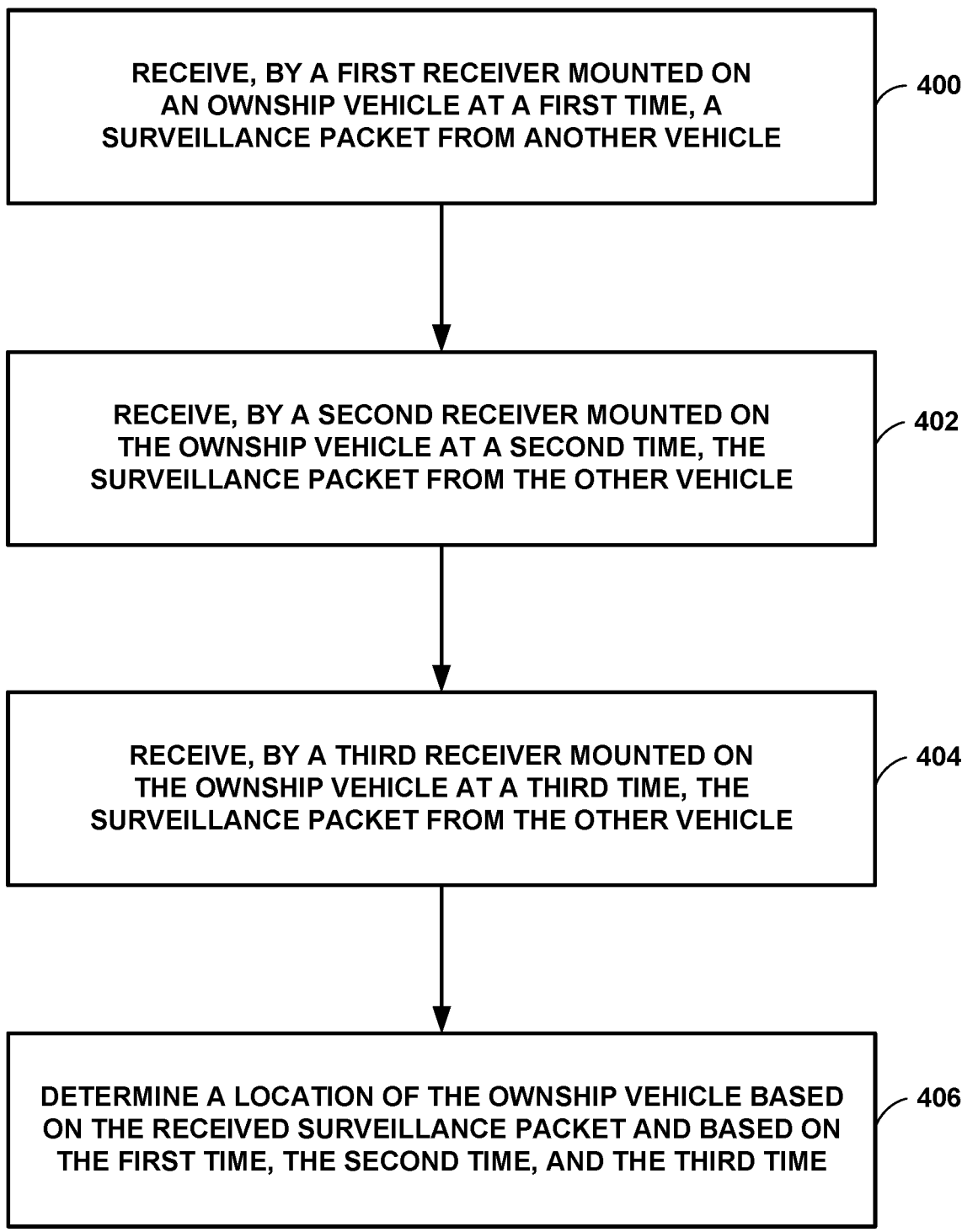
FIG. 4 is a flowchart illustrating an example process for determining the location of a vehicle, in accordance with some examples of this disclosure.

FIG. 4 is a flowchart illustrating an example process for determining the location of a vehicle, in accordance with some examples of this disclosure. The example processes of FIG. 4 are described with reference to processing circuitry 240 shown in FIG. 2, although other components such as a system mounted on vehicle 100 may exemplify similar techniques.

In the example of FIG. 4, a first one of receivers 230 receives surveillance packet 220 from vehicle 210 at a first arrival time (400). A second one of receivers 230 receives surveillance packet 220 from vehicle 210 at a second arrival time (402). A third one of receivers 230 receives surveillance packet 220 from vehicle 210 at a third arrival time (404). Receivers 230 are arranged or mounted at different positions on vehicle 200 such that the first, second, and third arrival times are not necessarily the same. Processing circuitry 240 may be configured to determine the arrival times based on a single internal clock or a dedicated clock for each of receivers 230. Vehicle 100 can choose from multiple surveillance packets 120A-120C by identifying the signal strengths of surveillance packets 120A-120C and filtering out the strongest signal strength sources.

In the example of FIG. 4, processing circuitry 240 determines a location of vehicle 200 based on surveillance packet 220 and the three arrival times (406). Processing circuitry 240 can use the signal strength of the signal carrying surveillance packet 220, the location of vehicle 210 as indicated in surveillance packet 220, the angle of arrival of surveillance packet 220 as determined by processing circuitry 240, and/or the transmission time indicated in surveillance packet 220 to determine the location of vehicle 200.

This disclosure describes multiple techniques for determining the location of an ownship vehicle. These techniques can be used with a single receiver, two receivers, three receivers, four receivers, or even more than four receivers. These techniques can be used with a single surveillance packet or with multiple surveillance packets, whether transmitted by a single source or by multiple sources. Moreover, the techniques can include using known weather conditions, data contained in a surveillance packet, and/or a response time from between the transmission of interrogation message to the receipt of a reply message in order to determine the location of the ownship vehicle. Processing circuitry of this disclosure may be configured to use any combination of these techniques, including just one approach, multiple approaches, or all of these approaches.

The following numbered examples demonstrate one or more aspects of the disclosure.

Example 1. A method includes receiving, by a first receiver mounted on an ownship vehicle at a first time, a surveillance packet from another vehicle. The method also includes receiving, by a second receiver mounted on the ownship vehicle at a second time, the surveillance packet from the other vehicle. The method further includes receiving, by a third receiver mounted on the ownship vehicle at a third time, the surveillance packet from the other vehicle. The method includes determining a location of the ownship vehicle based on the received surveillance packet and based on the respective arrival times.

Example 2. The method of example 1, where determining the location of the ownship vehicle is based on a location of the other vehicle indicated by data in the received surveillance packet.

Example 3. The method of example 1 or example 2, where determining the location of the ownship vehicle is based on a time difference of arrival for the respective arrival times.

Example 4. The method of examples 1-3 or any combination thereof, where determining the location of the ownship vehicle includes performing a multilateration analysis based on the respective arrival times and relative positions of the at least three receivers.

Example 5. The method of examples 1-4 or any combination thereof, where determining the location of the ownship vehicle includes performing a multilateration analysis based on data from an inertial navigation system.

Example 6. The method of examples 1-5 or any combination thereof, where determining the location of the ownship vehicle includes constructing a geometry of signal arrivals at the at least three receivers.

Example 7. The method of examples 1-6 or any combination thereof, further including determining the first time using a first clock for the first receiver and determining the second time using a second clock for the second receiver. The first clock is synchronized with the second clock.

Example 8. The method of examples 1-7 or any combination thereof, further including determining the third time using a third clock for the third receiver, where the third clock is synchronized with the first and second clocks.

Example 9. The method of examples 1-8 or any combination thereof, further including synchronizing the first clock and the second clock based on a GNSS clock.

Example 10. The method of examples 1-9 or any combination thereof, further including synchronizing the first clock, the second clock, and the third clock based on a GNSS clock.

Example 11. The method of examples 1-10 or any combination thereof, where the surveillance packet includes data indicating a transmission time of the surveillance packet, and where the method further includes determining a distance between the ownship vehicle and the other vehicle based on a time difference between the transmission time and one of the respective arrival times.

Example 12. The method of examples 1-11 or any combination thereof, further including receiving, by a fourth receiver mounted on the ownship vehicle at a fourth time, the surveillance packet from the other vehicle, where determining the location of the ownship vehicle is based on the received surveillance packet and the respective arrival times.

Example 13. The method of examples 1-12 or any combination thereof, further including determining weather conditions between the ownship vehicle and the other vehicle based on a determined distance from the ownship vehicle to the other vehicle and a strength of surveillance signals received by one or more receivers of the at least three receivers from the other vehicle.

Example 14. The method of examples 1-13 or any combination thereof, further including refine the determined location of the ownship vehicle based on a signal strength of the surveillance packet as received by the at least three receivers.

Example 15. The method of examples 1-14 or any combination thereof, further including determining weather conditions between the ownship vehicle and the other vehicle and determining an expected attenuation of the surveillance packet based on the weather conditions between the ownship vehicle and the other vehicle. The method also includes further refining the determined location of the ownship vehicle based on comparing the expected attenuation and the signal strength of the surveillance packet.

Example 16. The method of examples 1-15 or any combination thereof, further including receiving a second surveillance packet from a second other vehicle at a second set of arrival times, where determining the location of the ownship vehicle is based on the first and second surveillance packets and the arrival times of the first and second surveillance packets.

Example 17. The method of examples 1-16 or any combination thereof, further including receiving a second surveillance packet from the same other vehicle at a second set of arrival times, where determining the location of the ownship vehicle is based on the first and second surveillance packets and the arrival times of the first and second surveillance packets.

Example 18. The method of examples 1-17 or any combination thereof, where the other vehicle has not traveled directly towards or away from the ownship vehicle between transmission of the first surveillance packet and transmission of the second surveillance packet.

Example 19. The method of examples 1-18 or any combination thereof, further including determining an estimated location of the ownship vehicle based on a GNSS.

Example 20. The method of examples 1-19 or any combination thereof, further including determining comparing the location determined based on the arrival times and the estimated location based on the GNSS.

Example 21. The method of examples 1-20 or any combination thereof, further including determining, in response to comparing the first and second estimated locations, that the GNSS has been spoofed or that the surveillance packet is a spoofed packet.

Example 22. A system includes at least three receivers configured to receive a surveillance packet from another vehicle at respective arrival times. The system includes a first receiver configured to receive a surveillance packet from the other vehicle at a first time. The system also includes a second receiver configured to receive the surveillance packet from the other vehicle at a second time. The system further include a third receiver configured to receive the surveillance packet from the other vehicle at a third time.

In addition, the system includes processing circuitry configured to determine a location of the ownship vehicle based on the received surveillance packet and the respective arrival times.

Example 23. The system of example 22, where the receivers and the processing circuitry are configured to perform the methods of examples 1-21 or any combination thereof.

Example 24. A device includes a computer-readable medium having executable instructions stored thereon, configured to be executable by processing circuitry for causing the processing circuitry to perform the methods of examples 1-21 or any combination thereof.

Example 25. A system comprising means for performing each of the method steps of examples 1-21 or any combination thereof.

This disclosure has attributed functionality to processing circuitry 240. Processing circuitry 240 may include one or more processors. Processing circuitry 240 may include any combination of integrated circuitry, discrete logic circuitry, analog circuitry, such as one or more microprocessors, digital signal processors (DSPs), application specific integrated circuits (ASICs), and/or field-programmable gate arrays (FPGAs). In some examples, processing circuitry 240 may include multiple components, such as any combination of one or more microprocessors, one or more DSPs, one or more ASICs, or one or more FPGAs, as well as other discrete or integrated logic circuitry, and/or analog circuitry.

The techniques described in this disclosure may also be embodied or encoded in an article of manufacture including a non-transitory computer-readable storage medium, such as processing circuitry 240. Example non-transitory computer-readable storage media may include RAM, ROM, programmable ROM (PROM), erasable programmable ROM (EPROM), electronically erasable programmable ROM (EEPROM), flash memory, a hard disk, magnetic media, optical media, or any other computer readable storage devices or tangible computer readable media. The term "non-transitory" may indicate that the storage medium is not embodied in a carrier wave or a propagated signal. In certain examples, a non-transitory storage medium may store data that can, over time, change (e.g., in RAM or cache).

Various examples of the disclosure have been described. Any combination of the described systems, operations, or functions is contemplated. These and other examples are within the scope of the following claims.

What is claimed is:

1. A system configured to mount on an ownship vehicle, the system comprising:
   at least three receivers configured to receive a surveillance packet from another vehicle at respective arrival times, the at least three receivers comprising:
   a first receiver configured to receive, at a first time, a surveillance packet from the other vehicle;
   a second receiver configured to receive, at a second time, the surveillance packet from the other vehicle; and
   a third receiver configured to receive, at a third time, the surveillance packet from the other vehicle; and
   processing circuitry configured to determine a location of the ownship vehicle based on the received surveillance packet and the respective arrival times.

2. The system of claim 1, wherein the processing circuitry is configured to determine the location of the ownship vehicle based on:
   a location of the other vehicle indicated by data in the received surveillance packet; and
   a time difference of arrival for the respective arrival times.

3. The system of claim 1, wherein the processing circuitry is configured to determine the location of the ownship vehicle using a multilateration based on:
   the respective arrival times;
   relative positions of the at least three receivers; and
   data from an inertial navigation system.

4. The system of claim 3, wherein the processing circuitry is configured to determine the location of the ownship vehicle by constructing a geometry of signal arrivals at the at least three receivers.

5. The system of claim 1, wherein the processing circuitry is further configured to:
   determine the first time using a first clock for the first receiver;
   determine the second time using a second clock for the second receiver; and
   determine the third time using a third clock for the third receiver,
   wherein the first clock, the second clock, and the third clock are synchronized.

6. The system of claim 5, wherein the processing circuitry is further configured to synchronize the first clock, the second clock, and the third clock based on a Global Navigation Satellite System (GNSS) clock.

7. The system of claim 1,
   wherein the surveillance packet includes data indicating a transmission time of the surveillance packet, and
   wherein the processing circuitry is configured to determine a distance between the ownship vehicle and the other vehicle based on a time difference between the transmission time and one of the respective arrival times.

8. The system of claim 1,
   wherein the at least three receivers further comprises a fourth receiver configured to receive, at a fourth time, the surveillance packet from the other vehicle,
   wherein the processing circuitry is configured to determine the location of the ownship vehicle based on the received surveillance packet and the respective arrival times.

9. The system of claim 1, wherein the processing circuitry is configured to determine weather conditions between the ownship vehicle and the other vehicle based on:
   a determined distance from the ownship vehicle to the other vehicle; and
   a strength of surveillance signals received by one or more receivers of the at least three receivers from the other vehicle.

10. The system of claim 1, wherein the processing circuitry is configured to refine the determined location of the ownship vehicle based on a signal strength of the surveillance packet as received by the at least three receivers.

11. The system of claim 10, wherein the processing circuitry is configured to:
    determine weather conditions between the ownship vehicle and the other vehicle;
    determine an expected attenuation of the surveillance packet based on the weather conditions between the ownship vehicle and the other vehicle; and
    further refine the determined location of the ownship vehicle based on comparing the expected attenuation and the signal strength of the surveillance packet.

12. The system of claim 1,
wherein the surveillance packet is a first surveillance packet transmitted from a first other vehicle,
wherein the respective arrival times are a first set of arrival times,
wherein the at least three receivers are configured to receive a second surveillance packet from a second other vehicle at a second set of arrival times, and
wherein the processing circuitry is configured to determine the location of the ownship vehicle based on the first and second surveillance packets and the first and second sets of arrival times.

13. The system of claim 1,
wherein the surveillance packet is a first surveillance packet transmitted from the other vehicle,
wherein the respective arrival times are a first set of arrival times,
wherein the at least three receivers are configured to receive a second surveillance packet from the other vehicle at a second set of arrival times,
wherein the other vehicle has not traveled directly towards or away from the ownship vehicle between transmitting the first surveillance packet and transmitting the second surveillance packet, and
wherein the processing circuitry is configured to determine the location of the ownship vehicle based on the first and second surveillance packets and the first and second sets of arrival times.

14. The system of claim 1,
wherein the determined location of the ownship vehicle is a first estimated location of the ownship vehicle,
wherein the processing circuitry is configured to determine a second estimate location of the ownship vehicle based on a Global Navigation Satellite System (GNSS), and
wherein the processing circuitry is further configured to:
compare the first estimated location and the second estimated location; and
determine, in response to comparing the first and second estimated locations, that the GNSS has been spoofed or that the surveillance packet is a spoofed packet.

15. A method comprising:
receiving, by a first receiver mounted on an ownship vehicle at a first time, a surveillance packet from another vehicle;
receiving, by a second receiver mounted on the ownship vehicle at a second time, the surveillance packet from the other vehicle;
receiving, by a third receiver mounted on the ownship vehicle at a third time, the surveillance packet from the other vehicle; and
determining a location of the ownship vehicle based on the received surveillance packet and based on the respective arrival times.

16. The method of claim 15, wherein determining the location of the ownship vehicle based on:
a location of the other vehicle indicated by data in the received surveillance packet; and
a time difference of arrival for the respective arrival times.

17. The method of claim 15, wherein determining the location of the ownship vehicle comprises performing a multilateration analysis based on:
the respective arrival times;
relative positions of the at least three receivers; and
data from an inertial navigation system.

18. A device comprising a computer-readable medium having executable instructions stored thereon, configured to be executable by processing circuitry for causing the processing circuitry to:
determine a first time at which a first receiver mounted on an ownship vehicle received a surveillance packet from another vehicle;
determine a second time at which a second receiver mounted on the ownship vehicle the surveillance packet from the other vehicle;
determine a third time at which a third receiver mounted on the ownship vehicle the surveillance packet from the other vehicle; and
determine a location of the ownship vehicle based on the received surveillance packet and based on the respective arrival times.

19. The device of claim 18, wherein the instructions for determining the location of the ownship vehicle comprise instructions for determining the location of the ownship vehicle based on:
a location of the other vehicle indicated by data in the received surveillance packet; and
a time difference of arrival for the respective arrival times.

20. The device of claim 18,
wherein the surveillance packet includes data indicating a transmission time of the surveillance packet, and
wherein the instructions are configured to be executable by the processing circuitry for further causing the processing circuitry to determine a distance between the ownship vehicle and the other vehicle based on a time difference between the transmission time and one of the respective arrival times.

* * * * *